United States Patent
Guthmann

[15] 3,709,336
[45] Jan. 9, 1973

[54] RELEASE DEVICE FOR DRUM BRAKES

[72] Inventor: Herbert Guthmann, Wolfsburg, Germany

[73] Assignee: Volkswagenwerk Aktiengesellschaft, Wolfsburg, Germany

[22] Filed: Nov. 25, 1970

[21] Appl. No.: 92,684

[52] U.S. Cl..............188/351, 60/54.6 S, 188/196 A
[51] Int. Cl...............................................F16d 65/74
[58] Field of Search........60/54.5 S, 54.6 S; 188/348, 188/351, 352, 364, 196 A, 216

[56] References Cited

UNITED STATES PATENTS 2,345,811  4/1944  Harp.......................188/351
2,411,639  11/1946  Sawtelle................188/351 X

FOREIGN PATENTS OR APPLICATIONS 358,126  10/1931  Great Britain.............188/351
543,729  3/1942  Great Britain.............188/351

Primary Examiner—Duane A. Reger
Attorney—Watson, Cole, Grindle & Watson

[57] ABSTRACT

An adjusting device for a pressure operated drum brake having an auxiliary cylinder provided in a pipe leading to a wheel cylinder and a piston adjustable between limiting stops.

4 Claims, 1 Drawing Figure

PATENTED JAN 9 1973 3,709,336
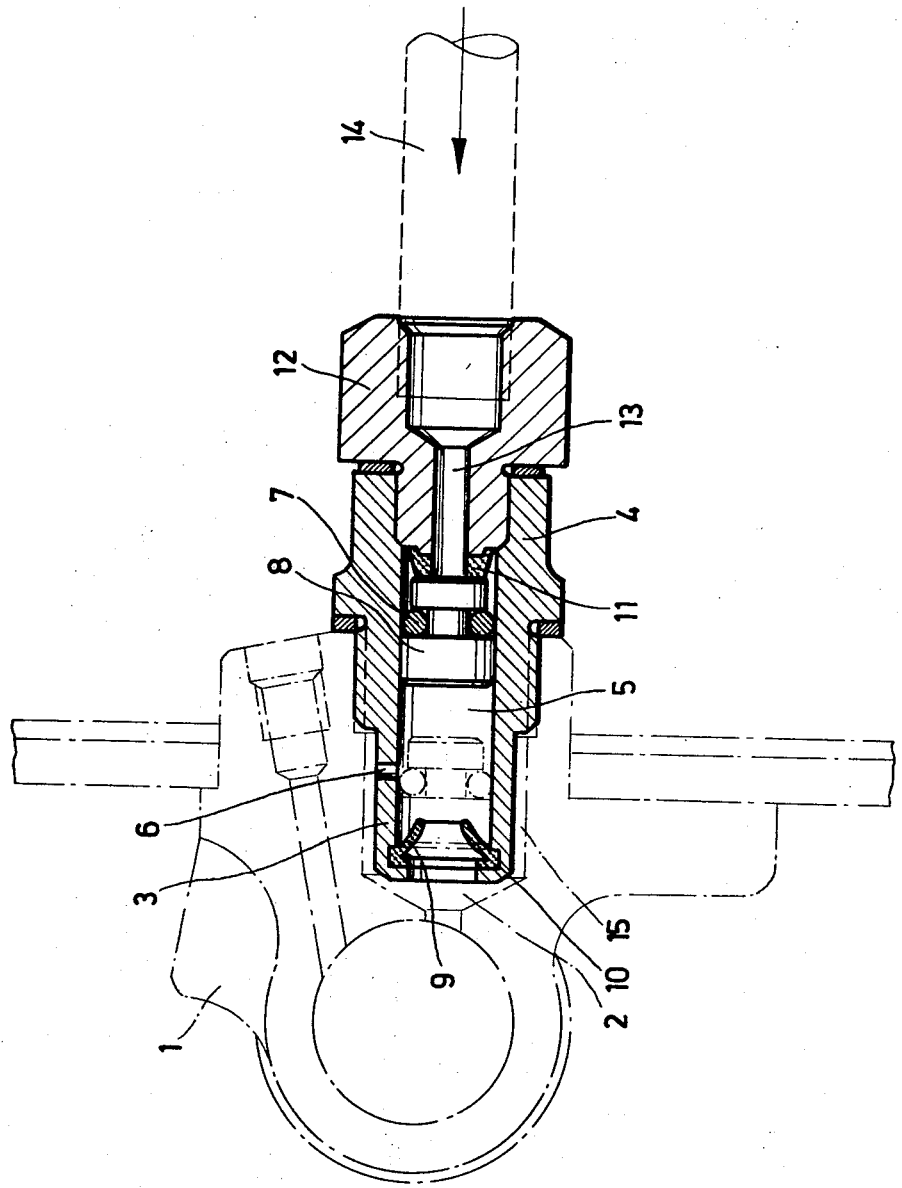
INVENTOR
Herbert Guthmann
BY
Watson, Cole, Grindle & Watson
Attys.

RELEASE DEVICE FOR DRUM BRAKES

This invention relates to an adjusting device for a hydraulic drum brake having an auxiliary cylinder located in a pipe leading to a wheel cylinder and a piston adjustable between limiting stops to establish the clearance in the working bore thereof.

Brake release devices of various types are known and a common feature of all these devices is that a valve or the like is provided in the piston which latter is assembled from a multiplicity of parts. The valve opens and allows the brake pressure to act on the wheel cylinder. The piston, when braking is initiated, displaces a quantity of fluid from the auxiliary cylinder and causes the brake shoe to abut against the brake drum. Such devices have, of necessity, many components and are therefore costly to produce and also have the disadvantage that, when the braking force is cancelled, a spring provided between the brake shoes cannot impart any pressure to the brake fluid to overcome the adhesive friction of the sealing ring of the piston. The piston therefore frequently gets arrested in a braking position and the brake shoes remain in frictional contact. Installing a stronger spring to load the brake shoes merely results in an increase of the force necessary to be applied to the brake pedal.

It is an object of the present invention to provide a brake adjusting apparatus which can be produced from only a few components within generous limits of tolerance thereby reducing production costs.

According to the present invention, there is therefore provided an adjusting device for a pressure operated drum brake comprising an auxiliary cylinder located in a pipe connected to a wheel cylinder and a piston located in the working bore thereof adjustable between limiting stops to effect clearance of the drum from the wheel. A resilient element is located in the auxiliary cylinder projecting axially into the path of the piston, which element acts as a wheel cylinder-side limiting stop for the piston and simultaneously allows the exposure of a bore passing through the wall of the auxiliary cylinder which communicates with the wheel cylinder by the piston.

The necessary sealing may be effected by increasing the application pressure of the piston sealing ring. The resilient element, which is compressed only during the last phase of braking, assists the brake shoe spring to cancel the braking force, so as to ensure that the piston disengages in a reliable manner. The sliding friction of the packing ring against the piston is then lowered along the path of travel of the piston.

Preferably the resilient element is an elastic gaiter which extends substantially fully across the bore of the auxiliary cylinder and fixed therein to the piston with its remote end. This gaiter may be mass produced in a simple manner and requires no additional fixing elements, since it may be press-fitted in the working bore of the auxiliary cylinder.

Advantageously an end collar is located in a receiving bore of the auxiliary cylinder and is isolated, said end collar having a bore passing therethrough into the wheel cylinder. At this point, a connecting pipe, which connects the auxiliary cylinder to the wheel cylinder while by-passing the piston, is formed in a simple manner by relatively enlarging the receiving bore, whereby an annular gap for the supply and discharge of brake fluid is formed after insertion of the auxiliary cylinder.

Further preferably on the master cylinder side, an elastic sealing ring is utilized as a stop for the piston which ring is located on the end face of a screw, the screw being positioned along the longitudinal axis of the auxiliary cylinder and having a passage bore extending therethrough.

The invention will be further described, purely by way of example, with reference to the accompanying drawing in which the single FIGURE shows in longitudinal section, a resetting device for a hydraulic drum brake for automotive vehicles.

A brake cylinder 1 has two brake pistons, not shown, located therein which have opposed strokes each co-operating with a brake shoe. In a screw threaded receiving bore 2 and leading into the interior of the cylinder 1, an end collar 3 of an auxiliary cylinder 4 is located which collar 3 is isolated. The auxiliary cylinder 4 is provided with a working bore 5 from which branches off a smaller bore 6 which passes through the wall of the end collar 3. A piston 8 provided with a sealing ring 7, is adjustable between limiting stops and is located in the bore 5. The wheel cylinder-side stop is formed by a resilient rubber gaiter 9, one end of which is fitted into an annular groove 10 provided in the working bore 5, and the other end thereof projects freely into the path of the piston. However, this end of the stop projects only far enough to impair the travel of the piston 8 over the ultimate section of its displacement path. A second stop is provided by a further sealing ring 11 located on the inner end face of a screw 12 which is inserted into the working bore 5 so as to seal it. This screw 12 has an axial bore 13 therethrough and is connected to a pipe 14 forming part of the brake system which leads to a master cylinder (not shown).

When a pressure increase in the pipe 14 occurs, the piston 8 moves from the position shown in the drawing against the gaiter 9, compresses it and pumps a fluid into the wheel cylinder. The fluid as is well known is such that it causes the brake shoes or the brake linings to contact the brake drum. At the same time, the sealing ring 7 exposes by the piston 8 the bore 6, so that brake fluid is free to flow through the annular gap 15 into the wheel cylinder 1, when the brake linings are worn.

When the drum brake is released, the gaiter 9 expands. The piston 8 is moved thereby so that the adhesive friction between the sealing ring 7 and the auxiliary cylinder 4 is converted into sliding friction. The bore 6 then becomes closed. When the piston 8 resumes its original position, back pressure builds up in both the wheel cylinder 1 and the auxiliary cylinder 4, and urges the piston 8 firmly against the sealing ring 11. Since no more fluid can escape from the wheel cylinder 1, a constant release clearance is obtained for the brake linings. The conventional non-return valve in the base of the master cylinder can therefore be omitted.

I claim:

1. A device for hydraulically adjusting the shoe-drum clearance of a hydraulically actuated shoe-drum brake system comprising a cylinder located between the master cylinder and the brake cylinder of the brake system, said cylinder having an inlet port, an outlet port and an auxiliary port, said outlet port lying downstream of said inlet port during flow of the hydraulic medium from the master cylinder to the brake cylinder, said auxiliary port lying between said inlet port and said outlet port and passing through the wall of said cylinder and having communication with said brake cylinder outwardly of said cylinder, and a piston located in a working bore provided for said cylinder, said cylinder being provided with stops limiting the travel of said piston, one of said stops being located nearer said outlet port and being constructed as a resilient element, the free end of said element projecting slightly axially into the traveling path of the said piston so that it contacts said piston during braking only during the last phase of the movement of said piston, and said element, during braking in a compressed state defining an end position of said piston such that the inlet port is in communication with the brake cylinder via the auxiliary port.

2. An adjusting device according to claim 1, in which said resilient element is an elastic gaiter which extends substantially fully across said bore of said cylinder and is fixed therein at one end of said cylinder which is remote from said piston.

3. An adjusting device according to claim 1, in which an end collar of said cylinder is provided located in a receiving bore provided in the wall of said brake cylinder in an isolated position therein, said end collar having said bore passing therethrough into said brake cylinder.

4. An adjusting device according to claim 1, in which an elastic sealing ring is provided on the master cylinder side of the working base of said cylinder and is utilized as a stop for said piston, said ring being located on the end face of a screw and the latter being positioned along the longitudinal axis of said cylinder and having a passage bore extending therethrough.

* * * * *